United States Patent [19]

Shroy, Jr. et al.

[11] Patent Number: 4,891,757

[45] Date of Patent: Jan. 2, 1990

[54] MEDICAL IMAGING SYSTEM AND METHOD HAVING GRAY SCALE MAPPING MEANS FOR INDICATING IMAGE SATURATION REGIONS

[75] Inventors: Robert E. Shroy, Jr., Willoughby; Karen L. Lauro, South Euclid; Richard A. Sones, Cleveland Heights, all of Ohio

[73] Assignee: Picker International, Inc., Cleveland, Ohio

[21] Appl. No.: 852,023

[22] Filed: Apr. 14, 1986

[51] Int. Cl.$^4$ .................... G06F 15/42; H04N 7/18
[52] U.S. Cl. ................. 364/413.13; 378/901; 358/111; 358/96
[58] Field of Search ............... 358/111, 166, 160, 96; 378/99, 901; 364/414

[56] References Cited

U.S. PATENT DOCUMENTS

| | | | |
|---|---|---|---|
| Re. 32,164 | 5/1986 | Kruger | 378/22 |
| 4,229,764 | 10/1980 | Danos | 358/96 |
| 4,257,063 | 3/1981 | Loughry | 358/108 |
| 4,595,949 | 1/1986 | Fenster | 358/111 |
| 4,636,954 | 1/1987 | Komatsu | 358/111 |
| 4,674,108 | 6/1987 | Asahing | 378/99 |

OTHER PUBLICATIONS

Pennington, E. C., et al, High Bandpass Spatial Filtering of the Primary X-Ray Beam, Department of Radiology, the University of Texas Health Science Center at Dallas.

Primary Examiner—Jerry Smith
Assistant Examiner—Gail O. Hayes
Attorney, Agent, or Firm—Watts, Hoffmann, Fisher & Heinke Co.

[57] ABSTRACT

An artifact inducing image acquisition mapping system and technique is described for use in connection with digital imaging. A gray scale mapping technique is employed to indicate to an operator the brightness function of each pixel of an image. Where the brightness function is less than 95% of saturation, the image is displayed normally. Where the brightness function is at least equal to the saturation full scale value, that portion of the image is displayed in total black. Where the brightness function is between 95% and 100% of saturation full scale value, the image portion is displayed as mixed dark and light, i.e., a speckled region. An alternate embodiment simply displays saturated regions to total black.

24 Claims, 5 Drawing Sheets

MEDICAL IMAGING SYSTEM AND METHOD HAVING GRAY SCALE MAPPING MEANS FOR INDICATING IMAGE SATURATION REGIONS

TECHNICAL FIELD

This invention relates to the field of medical diagnostic imaging, and more particularly is applicable to x-ray imaging employing digital image processing and display techniques.

BACKGROUND ART

A known type of digital x-ray imaging system, directed particularly to vascular-imaging, includes an x-ray source for directing x-rays through a patient to be examined, and an image intensifier tube aligned to receive a pattern of x-rays emergent from the patient's body. The image tube converts received x-rays to a corresponding visible light image. A television system views the light image and produces a set of analog signals describing that image. A digital angiography subtraction unit (DAS) receives the analog signals, and digitizes them, storing the signals in memory. The memory address of a particular stored signal denotes the portion, or "pixel" of the image which is represented by that signal. The stored digital signals each bear information defining the brightness of the image at the corresponding pixel.

The digital angiography subtraction unit includes circuitry which, when programmed by appropriate known software, causes the digital angiography subtraction unit to process and enhance the digital signals in various known ways.

The digital angiography subtraction unit also includes digital to analog conversion means for reconverting the stored and/or enhanced digital signals to analog form, for display on an appropriate analog monitor.

An imaging system such as described above is embodied, for example, in a vascular imaging system designated the "DIGICON 260", manufactured and sold by Picker International, of Cleveland, Ohio, U.S.A. Other such systems include a DIGICON 160, and an ANGICON, also made and sold by Picker International. A known form of digital angiography subtraction unit is a product designated as "DAS 211", also sold by the above referenced Picker International.

In operating such a digital vascular imaging system, before a series of diagnostic quality images can be acquired with the system, the user should acquire one or more test images as well. These test images are sometimes called "technique" images, and are often said to be acquired by means of a "technique shot".

The technique images serve two purposes. They show whether the anatomy of interest is receiving a proper radiation exposure. Also, they show whether images to be taken later will have any "hot spots".

"Hot spots" are those portions of the image that are so bright that the digital imaging system becomes saturated, and cannot handle them properly, because signals depicting those spots are greater than the dynamic range inherently defined as a limitation of the system.

"Hot spots" occur mainly at areas of the anatomy which are air filled, such as the lungs, throat, etc. When radiation intensity is raised to a level high enough to penetrate, and therefore image, more dense portions of the body, such as the mediastinum, the resulting radiation is too intense in areas corresponding to air filled organs. Therefore, when the radiation is sufficiently high to image thick and dense portions of the anatomy, the radiation is too high to image the air filled regions properly. As pointed out above, the digital processing equipment has the inherent limitation that it cannot properly handle brightness information above a "saturation" level.

If there are any saturated areas, some type of x-ray absorber element is often placed between the source and the patient in the area of the "hot spot" so that saturation is eliminated. After the absorber is put in place, another technique image must be done to see if saturation has been eliminated.

Portions of absorber material having different shapes, thicknesses and compositions are kept available in "kits", to tailor the absorption characteristics to optimize the images.

In the past, only very limited image processing has been performed on technique images. The unprocessed technique image was usually displayed to an operator, who had to judge whether saturation existed in any portion of the image. The operator generally tried to judge saturation by visual inspection of the image, i.e., by looking for loss of detail that usually accompanies such saturation.

An aid to the operator has also been employed. In a known system, a set of six histogram plots corresponding to the brightness along six parallel spaced lines at different locations in the image is produced. An operator can couple information obtained from the histograms with visual inspection to ascertain whether saturation is present.

A problem with this approach is that many operators have difficulty interpreting exactly what the histograms tell them. Also, the histograms only show information for the six image lines to which they correspond. Obviously, there are sizable gaps in he image with no corresponding histogram information. In these gaps, the operator must look for a very subtle loss of image detail to judge if there is saturation. Even experienced operators sometimes have trouble making this judgment.

Additionally, the operators have difficulty relating hot spot location to the anatomy. They therefore have trouble deciding precisely where to apply the x-ray absorbers.

The net effects of these problems are that operators of such vascular imaging systems spend considerable time performing technique shots, and, even with multiple technique acquisition, many actual digital study runs still have information loss due to areas of saturation.

Disadvantages sometimes result where a portion of the field of view to be imaged includes a region outside the patient's body, i.e., a region in which radiation passes from the source to the detector, such as the image tube, in vascular imaging systems, without passing through a portion of the patient's body. Often, when the radiation is adjusted to a sufficiently high level to image the patient's body structures, the region or portion of the field of view outside the patient's body will be saturated. For purposes of the present disclosure, any portions of the field of view of the detector in which radiation passes directly to the detector without first passing through the patient's body will be called "air regions".

Where these air regions generate saturation, they will appear in the image as intensely white, or bright. Some persons interpreting the images find this phenomenon to be distracting and to degrade the image. Also, processing information derived from air regions adds nothing to the information obtained about the patient's body, but still occupies a substantial portion of the information processing capability of the system.

Other types of x-ray imaging systems such as digital radiographic systems employing detectors with discrete detector elements, rather than an image tube and television chain, also suffer disadvantages from saturation. The disadvantages suffered by such digital radiography systems include some of those associated with the above described vascular imaging system, and some different disadvantages as well.

In digital radiography, the source directs x-radiation through a patient's body to a detector in the beam path beyond the patient. The detector, by use of appropriate plural discrete sensor elements, responds to incident radiation to produce analog signals representing the sensed radiation image, which signals are converted to digital information and fed to a digital data processing unit. The data processing unit records, and/or processes and enhances the digital data. A display unit responds to the appropriate digital data representing the image to convert the digital information back into analog form and produce a visual display of the patient's internal body structure derived from the acquired image pattern of radiation emergent from the patient's body. The display system can be coupled directly to the digital data processing unit for substantially real time imaging, or can be fed stored digital data from digital storage means such as tapes or disks representing patient images from earlier studies.

Digital radiography includes radiographic techniques in which a thin spread beam of x-rays is used. In this technique, often called "scan (or slit) projection radiography" (SPR) a spread beam of x-rays is directed through a patient's body. The spread beam is scanned across the patient, or the patient is movably interposed between the spread beam x-ray source and an array of individual cellular detector elements which are aligned along a path. Relative movement is effected between the source-detector arrangement and the patient's body, keeping the detector aligned with the beam, such that a large area of the patient's body is scanned by the spread beam of x-rays. Each of the detector segments produces analog signals indicating characteristics of the received x-rays.

These analog signals are digitized and fed to the data processing unit which operates on the data in a preselected fashion to actuate the display apparatus to produce a display image representing the internal structure and/or condition of the patient's body.

Details of digital radiographic systems are set forth in the following documents, all of which are hereby expressly incorporated by reference:

Lehman, L. A. et al: "Generalized Image Combinations In Dual KVP Digital Radiography", *Medical Physics* 8:659–667, 1981;

Published European Patent Application No. 83307157.4, published on Aug. 8, 1984 by Gary T. Barnes;

U.S. Pat. No. 4,383,327 issued May 10, 1983 to Robert A. Kruger and entitled "Radiographic Systems Employing Multi-Linear Arrays of Electronic Radiation Detectors".

One of the advantages of digital radiography and fluoroscopy is that the digital image information generated from the emergent radiation pattern incident on the detector can be processed, more easily than can analog data, in various ways to enhance certain aspects of the image, to make the image more readily intelligible and to display a wider range of anatomical attenuation differences.

One of these image-enhancing processing techniques is automatic gain correction. An example of such gain correction is described in U.S. Pat. Application Ser. No. 798,428, filed on Nov. 15, 1985 by Richard A. Sones, et al. and assigned to the assignee of the present application, and which is expressly incorporated by reference. The use of automatic gain correction, however, gives rise to a particular disadvantage in digital radiography. More specifically, when gain correction is used in digital radiography, distracting streaks sometimes appear in the portion of the image corresponding to the air regions.

Briefly summarized, gain correction involves multiplication of the brightness value produced by a discrete detector element by a gain factor which is uniquely associated with that element. Even where the radiation level sensed across an air region is fairly uniform, processing of image information corresponding to the air region in accordance with the respective gain factors of the individual detector elements will yield differences in image brightness, which will show up in the air region portion of the image as one or more streaks, blotches, or the like. Such would be the case, for example, if two adjacent detector elements both represented a saturation level of radiation, but one had a gain correction factor of 1.1 and the other a gain correction factor of 0.9.

While digital radiographic imaging procedures performed with cellular multi-element detectors do not usually include the taking of "technique" shots such as described in connection with the previously referenced vascular imaging system incorporating the television chain, the digital radiographic system suffers saturation-related disadvantages similar to those of the vascular systems, with respect to the extreme brightness of the air regions, and share the undesirability of requiring the system to process saturation indicating data corresponding to air regions, which contributes nothing to the image of the patient's body.

With respect to the disadvantage of having to process image data corresponding to air regions, the amount of time wasted in processing such air region data varies as a function of the ratio of the area of the imaging system field of view corresponding to the air region, on the one hand, and to that corresponding to the patient data, on the other.

It is an object of this invention to provide system and method for acquiring technique images having particular deliberately added artifacts for indicating whether and where image saturation or near saturation has occurred, and to reduce undesirable results of saturation in air regions.

Disclosure of Invention

The disadvantages of the prior art are reduced or eliminated by operating upon the technique image prior to its display, to add artifacts to the image as a function of respective image pixel brightness values relative to saturation.

In accordance with an embodiment of the present invention, a digital medical diagnostic imaging system is provided. The system includes structure which defines a subject examination station for accommodating a patient to be examined. A source causes radiation to pass through and emerge from a portion of the patient's body when the patient is located at the station when the source is actuated. Imaging means responds to a pattern of emergent radiation from the patient's body to produce digital signals corresponding to an image of the sensed pattern. Display means including digital to analog conversion circuitry produces a visible image corresponding to that represented by the digital signals.

System control means is provided, and includes means for producing a study image, by control of the source, imaging and display means, in accordance with a protocol, which corresponds to a desired anatomical study to be made. The control means also includes means for controlling the source, imaging and display means, to produce a test, or technique, image prior to the production of the study image. The technique image need not be performed in accordance with the preselected protocol which is used to obtain the study image.

An important aspect of this embodiment of the invention resides in the inclusion of means for modifying, or processing the technique image. This feature enables the enhancement of the technique image in order to increase its utility to the operator in pre-evaluating the planned protocol for obtaining the actual study image.

More specifically, the means for modifying the technique image comprises circuitry for introducing artifacts into the technique image as a function of respective image pixel brightness.

The term "artifact," as used in this document, means any visible aspect of the image which does not correspond to the actual anatomical structure of the patient within the field of view defined by the image. Thus, a significant aspect of the invention resides in the deliberate introduction into a technique image of artifacts which correspond to and are used as indicators of ranges of relative brightness of various pixels of the image, with respect to full scale saturation value for the particular system being used.

In accordance with a more specific aspect of the invention, the study and technique images each comprise a plurality of discrete image pixels. The imaging means comprises digital signal storage circuitry which, because of inherent limitations of such circuitry, necessarily defines a full scale saturation value for brightness information borne by each digital signal stored in the storage means. The imaging means further includes circuitry for comparing the brightness value of each digital signal to the full scale saturation value. The system further includes circuitry for operating upon each image display pixel to introduce an artifact to that pixel display as a function of the relation between the brightness value of the digital signal corresponding to that pixel and the full scale saturation value.

In accordance with a more specific feature, the artifact introducing circuitry includes means for operating in accordance with the following characteristics:

(1) where the brightness value of a digital signal for a pixel corresponds to at least 100% of the full scale saturation value, the corresponding pixel is displayed in black;

(2) where the brightness value corresponding to a digital signal for a pixel is less than a predetermined fraction of the full scale saturation value, the brightness of the corresponding pixel is displayed linearly, i.e., without modification, and (3) where the brightness signal corresponding to a digital signal for a pixel is in an intermediate range of values greater than the predetermined fraction of said full scale saturation value, but less than the full scale saturation value, the pixel is displayed in accordance with an alternating dark and light gray scale mapping technique, wherein the intermediate range of brightness values is divided into a succession of increments, and display of image pixels alternates between black and linear (unmodified) display, as a function of within which increment of the range the particular brightness value of each respective pixel falls, the function being defined as alternating black and linear display over an ascending sequence of increments within the intermediate range.

For the purposes of this disclosure this technique of paragraph (3) will be referred to as "alternating dark and light gray scale mapping."

The effect of introducing artifacts as described above is as follows: where the brightness values do not nearly approach saturation value, the image is displayed normally. Where a true "hot spot" is located, such that saturation is reached, the portion of the image corresponding to the saturated region is displayed in total black. Generally speaking, surrounding the saturated, or total black, areas will be an intermediate area of near saturation, which will appear displayed as speckled areas.

It can be seen that the present system greatly facilitates an operator's ready identification of saturated and near saturated portions of a technique image. Because the indications of saturation and near saturation are actually superposed on the image itself, this facilitates the operator's easy choice and location of any added absorber elements which are placed between the patient and the source to attenuate the radiation emergent from the patient's body in the portion of the field of view which corresponds to the saturated region.

More specifically, the image altering operation is a gray scale mapping which has the following characteristics:

1. If the pixel being imaged has a brightness below 95% of saturation, the brightness of the displayed pixel is not changed;
2. If the pixel being mapped has a brightness at 100% of saturation, the brightness is changed to total black;
3. For pixel brightnesses between 95% and 100% of full scale saturation, the brightness is displayed in accordance with an alternating dark and light gray scale mapping technique.

In the use of the present invention, all areas, or pixels, of each technique image are sampled for saturation, not merely the six lines sampled by the histograms of the prior art. Saturation is easily and unmistakably observed by visual inspection of the altered technique image, and no judgment is required in ascertaining whether saturation has occurred, or where it has occurred. Because the saturated areas are displayed in the patient image, rather than on a histogram, it is easy for an operator to relate the saturation location information shown in the altered technique image to actual areas of the patient's anatomy. This, of course, enables placement and selection of x-ray absorber elements, (e.g., material, shape, thickness, etc.) as needed, to be done with greater accuracy.

The embodiment of the present invention is also advantageous in dealing with signals identifying brightness values for pixels within air regions, i.e., regions within the field of view in which radiation from the source strikes the detector without first passing through the patient's body. Where an air region is brightness saturated, the entire saturated air region will be turned to black. This has several important benefits. First, the excessively bright portion of the picture is eliminated and no longer provides distraction from the portion of the image depicting patient body structure. Secondly, where the system simply turns the air region black, there is no need to process any information corresponding to the air region itself. Signals resulting from saturated areas, such as from the air region, can be simply discarded from the ensemble prior to image processing.

Thirdly, where a digital radiography system is used employing a cellular multi-discrete element detector, turning the air regions black in response to saturation eliminates streaking of the saturated portion of the air region portion of the image which would sometimes otherwise result if image gain and/or offset correction techniques are used.

These and other aspects of the invention will be understood from a reading of the following specific description, and from the drawings, in which:

BEST MODE FOR CARRYING OUT INVENTION

Figure 1:
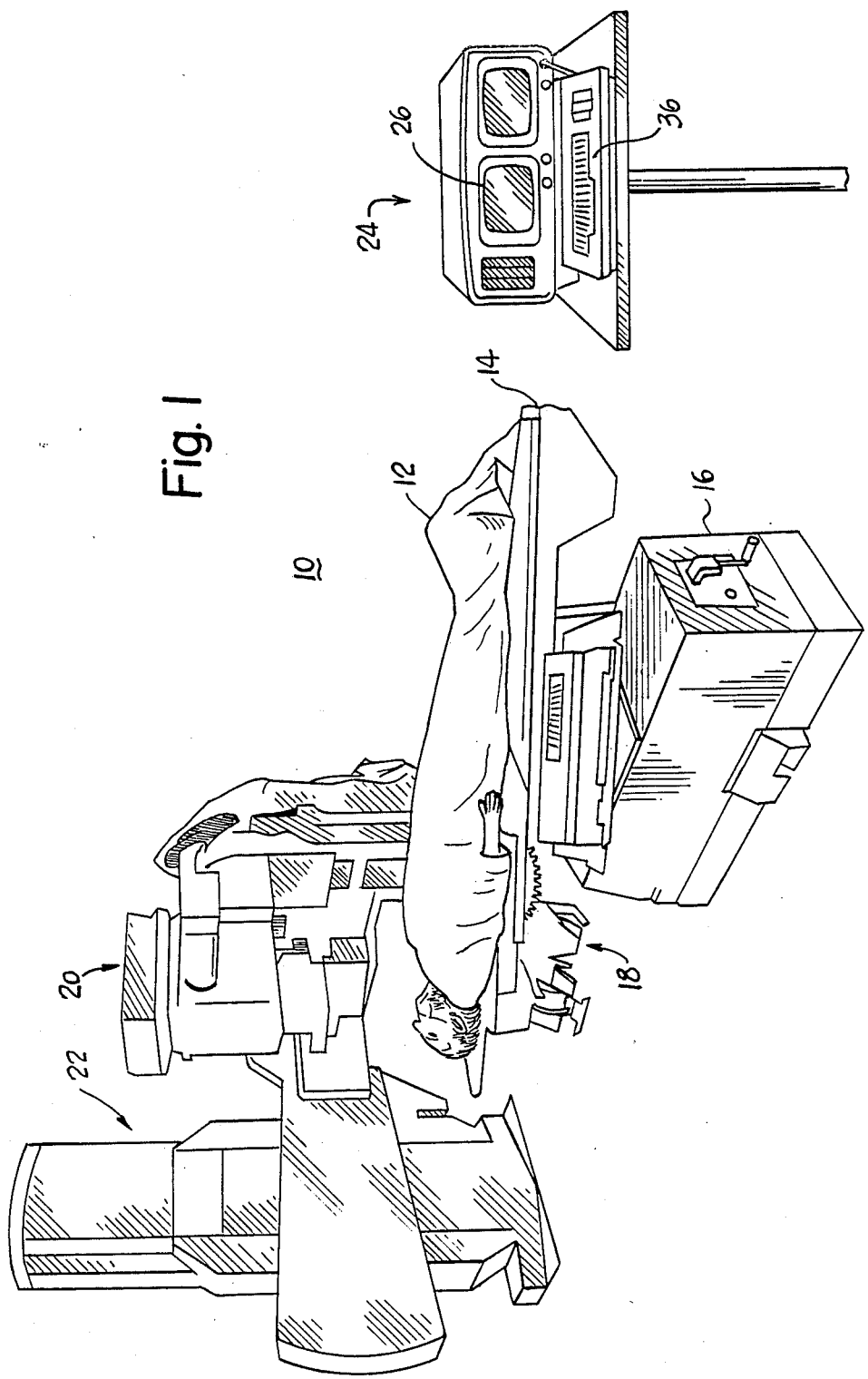
FIG. 1 is a pictorial view of a system incorporating the present invention.

FIG. 1 illustrates in pictorial form a system 10 for acquiring digital images by the use of x-rays. A patient 12 rests upon a table 14 which is movably supported on support structure 16, and which defines a patient examination station. An x-ray source 18 directs x-rays upwardly from beneath the table through the patient's body. An imaging unit 20 is aligned with the source to receive x-ray energy emergent from the patient's body. The imaging unit 20 is movably supported on articulated structure 22 to facilitate movement of the imaging unit 20 into alignment with a desired portion of the patient's body.

An operating console 24 is electrically coupled to the imaging unit 20. The operating console 24 includes apparatus and circuitry for controlling the operation of some components of the system 10. The operating console 24 is coupled to a separate digital processing unit (DPU), shown in block form in FIG. 2 as 23, whose function is described in more detail below, and to an imaging monitor 26.

Figure 2:
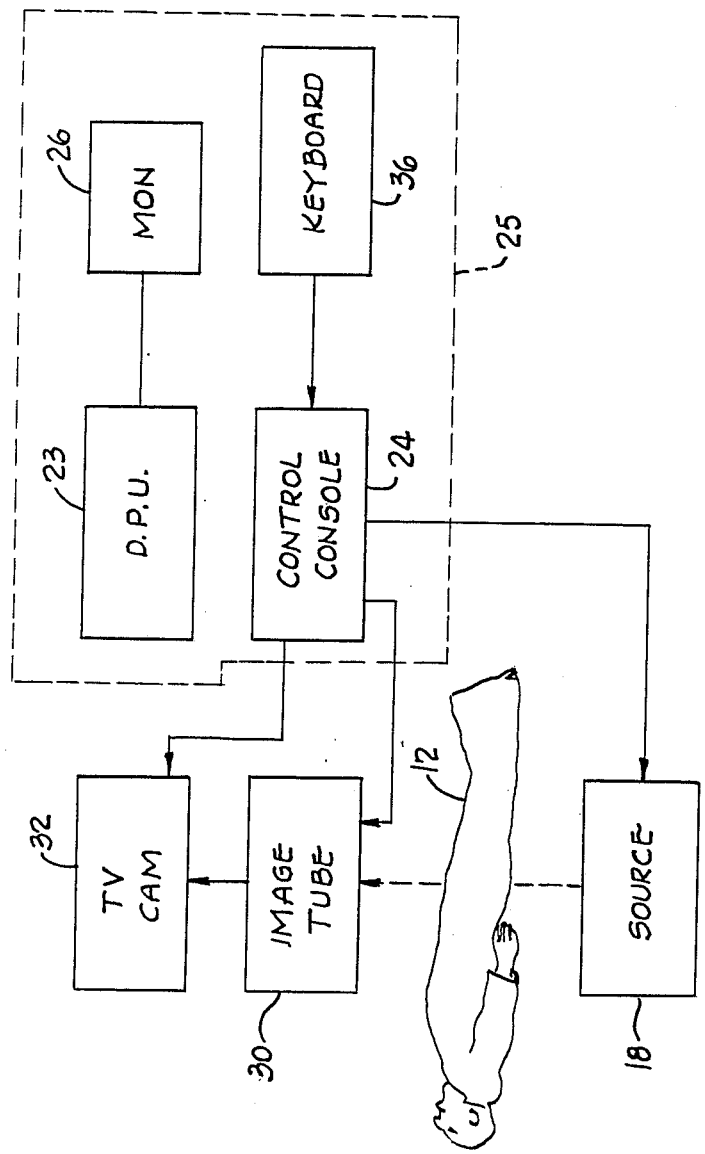
FIG. 2 is a simplified block diagram depicting portions of the system of FIG. 1.

FIG. 2 is a simplified block diagram illustrating major components of the system 10. In operation, the source 18, in response to a command signal from the control console 24, produces a pulse of x-rays which pass through the body of the patient 12 and are incident on an input face of an image intensifier tube 30. The image intensifier tube 30, in response to the incident pattern of x-rays, produces at an output face a visible light image corresponding to the pattern of received x-rays.

The image intensifier tube 30 input face defines an area sufficiently large that, at least in some instances, when a human subject is being imaged, there will be an air region, i.e., a region over which radiation passes directly from the source to the image tube input face without first passing through the patient. Often, when radiation is high enough to effectively image the patient's body, the air region will exhibit saturation over a large area. The present invention has as one purpose the improvement in handling data corresponding to the air region portion of the image, in a manner described in more detail below.

The visible light image produced by the image tube 30 is viewed by a television camera 32. The television camera 32, in response to command signals from the console 24, produces an ensemble of signals, including an analog video signal and horizontal and vertical synchronization signals, which describe in analog form the image viewed by the television camera 32.

The analog signals are transmitted to a digital angiography subtraction unit (DAS) 25, which includes the control console 24, digital processing unit 23, monitor 26 and a keyboard 36 (FIG. 2).

The digital angiography subtraction unit 25 digitizes the incoming analog signals. These digitized signals each represent the brightness of a particular respective corresponding portion, or pixel, of the image viewed by the television camera 32. Each of these digital brightness indicating signals is stored in a unique address in each of one or more digital memories. The address at which a particular signal is stored corresponds to the location of the pixel in the image whose brightness is represented by that stored signal.

The digital angiography subtraction unit 25 also includes apparatus and circuitry means for processing the digitized information in known ways in order to enhance the image represented by the digital information. On command, the digital angiography subtraction unit 25 reconverts the stored and/or enhanced digital information to analog form, which is then applied to the monitor 26 to produce an analog image viewable by an operator.

The operator communicates with and controls components of the system 10 by means of the keyboard 36.

The system 10 as described above includes means for making both "study" images and for making "technique" images. When instructed in one of a variety of particular ways, via the keyboard, the DAS 25 actuate the source to produce x-rays of a preselected level and duration. The DAS 25 is commanded to process the television signals thus acquired in accordance with a study protocol, which defines and corresponds to a particular desired anatomical study. The particular protocol differs from one type of anatomical study to another, in accordance with parameters which optimize the quality of the obtained image for displaying the particular desired anatomical organ or condition.

When instructed differently, via the keyboard, the DAS, can produce a "technique" or test image. The test image is obtained by actuating the source to produce a pulse of a particular level and duration, and by actuating the DAS to operate upon the received television signals in a particular way different from the manner in which the DAS operates upon the television signals in the course of a study image acquisition in accordance with one of the preselected study protocols.

In the preferred embodiment, the system 10 comprises a vascular imaging system designated the "Digicon 260", manufactured and sold by Picker International, Cleveland, Ohio, U.S.A. Also in the preferred embodiment, the system comprises a component designated the "DAS 211", also sold by the above referenced Picker International.

The practice of this invention, however, is not limited to use in the preferred system. The invention can be applied to use in any type of digital imaging system.

The Digicon 260 and DAS 211 are both known systems, and are commercially available. Accordingly, the intimate details of these commercially available systems will not be discussed here. The remainder of this disclosure describes the manner of modifying and using those components to achieve the apparatus and method embodying the present invention.

Briefly, the present invention involves apparatus, circuitry and method for modifying test, or "technique" images acquired by the use of the system 10 in a manner which facilitates determination of whether the displayed image exhibits saturation, or near saturation.

In accordance with the present invention, before the image from the "technique" shot is displayed, the stored digital information representing that image is altered, in accordance with a discontinuous gray scale mapping function. This modifying procedure comprises a gray scale mapping function having the following characteristics:
1. If the signal corresponding to the pixel being mapped denotes a brightness level below 95% of saturation, the brightness of that pixel is not changed;
2. If the signal corresponding to the pixel being mapped has a brightness of 100% of saturation, the brightness information of that signal is changed to that value denoting total black;
3. If the signal corresponding to the pixel being mapped denotes a brightness level in an intermediate range of between 95% and 100% of full scale saturation, the brightness information for that pixel is changed in accordance with an alternating dark and light gray scale mapping technique, as defined above, yielding usually an intermixed pattern of dark and light pixels.

When the modified image is viewed in an analog monitor, the image exhibits the following characteristics:
1. In any area of the image wherein the brightness is of a value below 95% of full scale saturation value, the image appears normally;
2. For any area of saturation of the image, there occurs a black patch surrounded by intermixed dark and light pixels, and
3. In areas wherein the brightness level is below the full scale saturation value, but above 95% of full scale saturation value, there are dark and light pixels, but no solid black patches.

These image characteristics render it easy for an operator to identify areas of the image at which saturation is occurring, and also areas at which the brightness is sufficiently close to saturation to warrant concern.

The speckled, or near-saturation, region also helps to confirm to the operator that the adjacent black regions are really saturation-indicating artifacts, and are not actual images of dense tissue, such as bone or tumor.

The practice of this invention enables the elimination of the judgment factor in ascertaining whether an image exhibits saturation, and where that saturation is located.

This invention is practiced utilizing the above referenced Digicon 260 and DAS 211 equipment, with the aid of the following specific explanation and description.

The DAS 211 system digitizes the brightness of each incoming image pixel to ten bits, but can only store eight bits. Therefore, the DAS 211 is provided with a way to compress this brightness information. The way the DAS 211 does this is by means of a look-up table. With this, any digital incoming brightness can be transformed to another preselected brightness level. In prior art operation, this transformation was linear for "technique" images and therefore no real image processing of technique images was performed.

In the present invention, the linear look-up table is replaced by one which performs the gray scale transform functionally described above. This new look-up table is generally configured as follows;
1. If the input digital value is below 95% of full scale, the output is scaled linearly, as in the prior art;
2. For input values between 95% and 100% of full scale, the output values alternate between a linear value and zero, in accordance with an alternating dark and light gray scale mapping technique, and
3. For input values at 100% of full scale the output is zero. This creates the black patch at saturation.

This acquisition map may be entered into the DAS 211 in one of two ways:
1. The DAS 211 allows an acquisition map to be entered point by point from the keyboard, and
2. The map can be copied in from storage.

Once the map has been incorporated in the DAS 211 together with other maps, any map can be specified as the one used in processing "technique" images.

Figure 3:
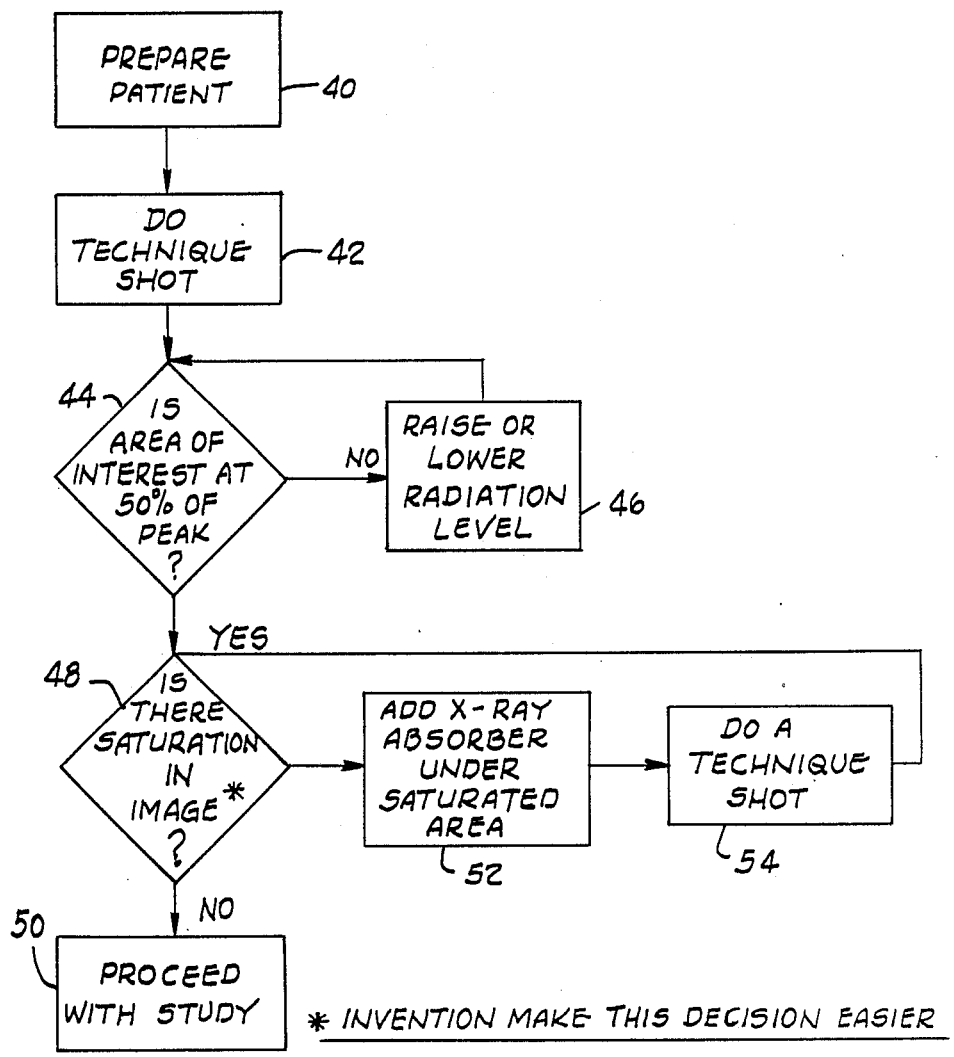
FIG. 3 is a flow cart illustrating a method of operation of the system of FIGS. 1 and 2.

FIG. 3 is a flow chart illustrating generally the procedure for preparing to do a study utilizing the system 10.

As stated at box 40, the patient is prepared and properly positioned on the table. As indicated at box 42, the x-ray source is caused to emit a pulse of x-rays, and a "technique" image is acquired in the manner generally described above. In diamond 44, a decision is made whether the area of interest in the displayed technique shot is at least 50% of full scale brightness value. If the answer is No, box 46 indicates that the radiation level should be manually adjusted so that the area of interest is at approximately 50% of full scale brightness value. Subsequent to such adjustment, another technique shot is performed.

If the area of interest is at approximately 50% of full scale value, another decision is made as indicated at diamond 48, i.e, whether saturation is present in the technique image. If it is determined that no saturation is present, the process proceeds to box 50 which indicates the desirability of proceeding with the actual study.

If saturation does appear in the technique image, the operator proceeds to the step indicated at box 52, which constitutes the addition of x-ray absorber material under the saturated region of the technique image, followed by the step indicated in box 54 which is the repetition of another technique shot and a reevaluation of whether saturation is present in that subsequent image.

In the preferred embodiment, the system 10 is modified to provide for implementation of the present invention by manually inserting the new acquisition map into the DAS 25 by way of the keyboard associated with that component. As pointed out above, the component to be modified comprises the above referenced DAS 211, which is commercially available in a preprogrammed state. The steps to be performed as called for below are implemented on the DAS 211 keyboard:

1. In the main DAS menu, choose 11 RUN OTHER PROGRAM
2. Run EXEC
3. At the prompt, type DIR FD0:ACMP.*

(This will list all the ACMP files. Acquisition maps are stored in ACMP files and making a new map results in a new ACMP file. Write down the names of existing ACMP files so you can later identify the new one. The DAS already has 3 ACMP files: .AZZ, .A00 and .A01.)

4. Return to main menu.
5. Choose 8 SYSTEM CHARACTERISTICS
6. Choose 4 ACQUISITION MAPS
7. Choose 3 CREATE AND STORE OTHER MAP
8. Choose 1 for KEYBOARD entry
9. Now enter the following data pairs

```
0, 0
3888,243
3904,0
3920,245
3936,0
3952,247
3968,0
3984,249
4000,0
4016,251
4032,0
4048,253
4064,0
4080,255
4095,0
```

10. When the DAS asks for the map name, use BOLUS AID
11. Return to main menu.
12. In the main menu, choose 8 SYSTEM CHARACTERISTICS
13. Choose 5 SELECT SETUP DEFAULTS
14. Step through menu until "Acquisition Map for Technique" is reached
15. Choose BOLUS AID map
16. Return to main menu At this point, the system has been modified such that, in any manual acquisition of an image, such as a technique shot, the invention will be implemented in accordance with the new map and the image will appear as described above. Also, any protocol made now will also produce the same type of image.

Figure 4:
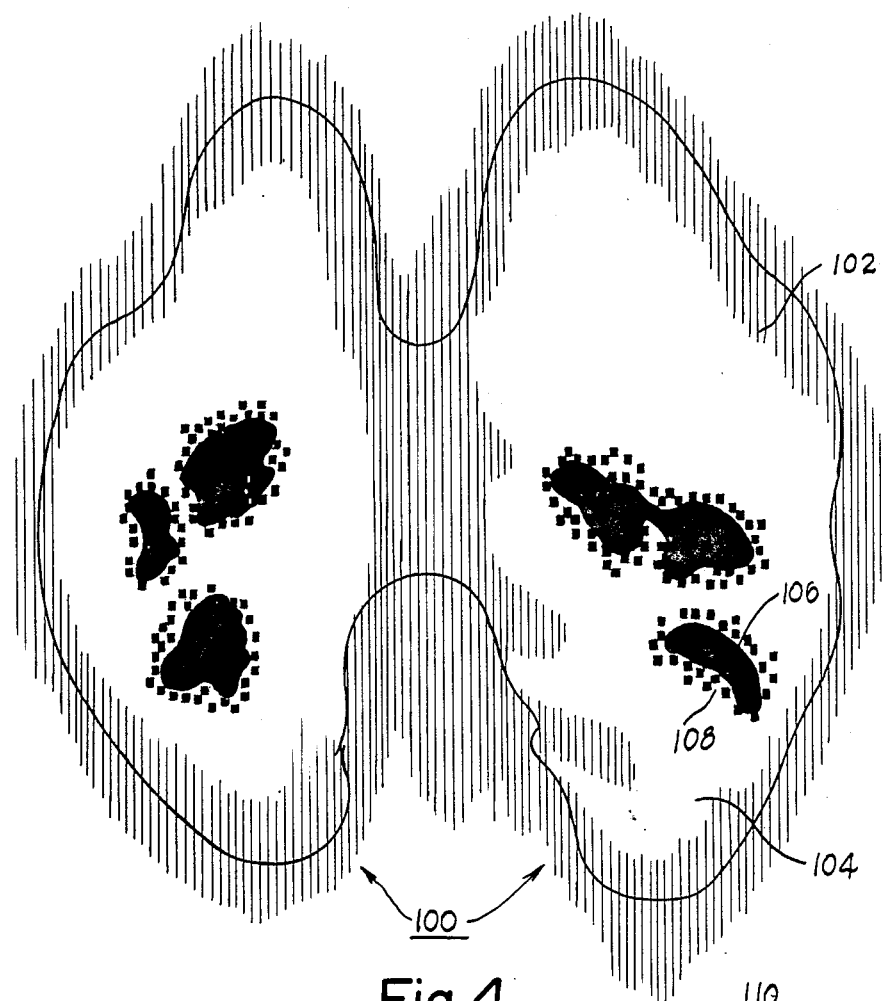
FIG. 4 is an illustration of an image acquired by operation of the system of FIGS. 1 and 2 in accordance with the manner of operation depicted in FIG. 3.

FIG. 4 illustrates a sample image obtained by the use of the present invention. The sample image 100 is depicted as an image of a human lung 102. Most of the image does not exhibit saturation, such as at the region 104, and that portion of the image not exhibiting saturation is displayed normally.

A portion of the image at 106 exhibits saturation, and the saturation is indicated by the total black portion in the image. The region 108 surrounding the saturated region has a brightness value which is between 95% and 100% of saturation, and is depicted by a speckled pattern.

FIG. 4 also depicts an air region, generally indicated at 110. In instances in which the pixels constituting the air region 110 have brightness signals associated therewith which exhibit saturation, the air region 110 will be turned black. This eliminates the excessive brightness of the air region in the picture, and also reduces the amount of brightness information to be processed by the system, improving data rates. Also, if any form of gain correction is employed in the system, darkening the air region will eliminate the effect of any streaking which might otherwise result.

Figure 5:
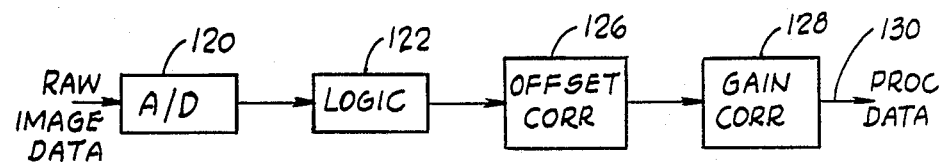
FIG. 5 is a block diagram illustrating the manner of incorporation of an aspect of the present invention into a digital radiography system employing a cellular detector having multiple discrete elements.

FIG. 5 is a block diagram illustrating an implementation of saturation mapping circuit and method for imaging systems such as digital radiography systems employing detector assemblies having a plurality of individual discrete detector elements.

Analog data from the detector array is fed to, and digitized by, an analog to digital converter 120. The digitized data then enters the saturation correction circuitry which comprises logic circuitry 122. The logic circuitry 122 comprises a circuit, which could be a simple look up table, easily designed by one of ordinary skill, to remap data passing through the logic circuitry to a zero value (black) when the digitized data corresponds to a pixel value of saturation, thus discarding the data. If the digitized data has not reached saturation, the logic circuitry transmits the data along in unmodified form.

An offset correction circuit 126 subtracts the offset level of the particular detector element involved from the image pixel data value, clipping to zero all values which turn out to be negative after this offset subtraction operation is performed.

Gain correction circuitry 128 multiplies the image data value for the pixel, corresponding to the individual detector element assigned to that pixel, by a predetermined gain factor which is unique to the detector involved.

Processed image data appears at an output lead 130.

It is significant to note that the elements shown in FIG. 5 may exist in parallel for each discrete element of the detector assembly of the digital radiographic system, or the analog and/or digital data may be multiplexed to some degree, in which case there may be fewer circuit chains (such as in FIG. 5) than there are detector elements. FIG. 5 shows only one circuit chain, in the interest of simplicity.

It should be pointed out that the implementation precisely described above is not the only way in which to implement the present invention. Rather, the present invention could also be implemented by the use of microprocessor circuitry of a fixed configuration, the design of which would be, with the aid of the present disclosure, within the ordinary level of skill in the art.

It should also be noted that the invention is not limited to the particular scheme of artifact generation described in connection with this specific embodiment. More, or fewer, types of artifacts could be generated, in accordance with need. The method of generating artifacts can also be different than as described in this disclosure. For example, inasmuch as the saturated portions of the image exhibit a "flat" brightness profile, saturated areas could be located by gradient filtering techniques.

It is also noted that this invention is by no means limited to the specific hardware systems described above. The present invention is readily extendible to use in any type of digital imaging, including digital radiography, ultrasonic imaging, NMR and others.

It is to be understood that the disclosure presented herein is intended as illustrative, rather than exhaustive of the invention. Persons of ordinary skill in the art may be able to make certain additions to, deletions from or modifications in the embodiments disclosed herein without departing from the spirit or the scope of the invention, as set forth in the appended claims.

We claim:

1. A digital medical diagnostic imaging system comprising:
   (a) structure defining a subject examination station for accommodating a patient to be examined;
   (b) a source means for causing radiation to pass through and emerge from a portion of a patient's body when situated at said station;
   (c) imaging means responsive to a pattern of said emergent radiation to produce a set of digital signals each bearing a brightness value of a portion of n image of said pattern;
   (d) display means including digital to analog conversion means for producing a visual image corresponding to that represented by said digital signals;
   (e) first control means for controlling said source, imaging and display means to produce a study image in accordance with a predetermined protocol corresponding to a desired anatomical study, and for producing a technique image prior to the production of said study image when desired;
   (f) means responsive to brightness values of said digital signals exceeding a predetermined level for altering brightness values of digital signals not corresponding to patient anatomy said alteration being performed in digital form and prior to conversion of said digital signals to analog form, without altering the brightness values of
   (g) means for modifying said technique image prior to its display by deliverate introduction of at least one artifact in response to a characteristic of said technique image;

2. The system of claim 1, wherein said altering means comprises:
   means for introducing a plurality of artifacts into said technique image, as a function of respective brightness values of said digital signals not corresponding to patient anatomy.

3. The system of claim 2, wherein:
   (a) said study and technique images each comprise a plurality of image pixels;
   (b) said imaging means comprises digital signal storage means having a limitation defining a full scale saturation value for brightness information borne by each said digital signal;
   (c) said imaging means further comprises means for comparing said brightness value of each said digital signal to said full scale saturation value; and
   (d) means for operating upon image display pixels to introduce an artifact to said pixel display as a function of relation between the brightness values of the digital signals corresponding to at least some of said pixels and said full scale saturation value.

4. The system of claim 3, wherein said alteration means includes means for operating in accordance with the following characteristic:
   where the brightness value of a digital signal for a pixel corresponds to at least 100% of said full scale saturation value, the corresponding pixel is displayed as black.

5. The system of claim 4, wherein said alteration means includes means for operating in accordance with the following characteristic:
   where the brightness value corresponding to a digital signal for a pixel is less than a predetermined fraction of said full scale saturation value, the brightness of the corresponding pixel is displayed without modification.

6. The system of claim 4, wherein said alteration introducing means includes means for operating in accordance with the following characteristic:
   where the brightness signal corresponding to a digital signal for a pixel is greater than a predetermined fraction of said full scale saturation value, but less than said full scale saturation value, said pixel is displayed in accordance with an alternating dark and light gray scale mapping technique.

7. In a digital medical diagnostic anatomical imaging system including means for generating digital signals for producing a first techniques image for pre-examination of study imaging protocol, and means for acquiring said study protocol image, the improvement comprising:
   means for altering brightness values of said digital signals not corresponding to patient anatomy while in digital form and prior to display of said technique image in response to the existence of predetermined characteristics of said brightness values of said digital signals, while leaving unaltered the brightness values of signals corresponding to patient anatomy.

8. The improvement of claim 7, wherein said alteration adding means comprises:
   means for modifying said techniques image as a function of saturation and near saturation existent in said technique image.

9. A digital system for imaging an short comprising:
   (a) means responsive to a pattern of radiation energy for producing a set of digital signals representing said pattern, said digital signals bearing brightness information corresponding to a particular pixel of said image;
   (b) means for altering the brightness values of member of said set of digital signals not corresponding to object structure as a function of brightness information in accordance with a discontinuous gray scale mapping technique;
   (c) means for converting said digital signals to analog form subsequent to said alteration and for displaying in visual form an image corresponding to said altered digital signals.

10. The system of claim 9, wherein said altering means comprises means for introduction into the means of said digital signals not corresponding to the object structure information defining an aspect of the image described by said members which, after said members are converted to analog form and displayed, causes the appearance of artifacts in said displayed image, said artifact not corresponding to the actual.

11. An imaging system comprising:
   (a) structure defining a subject examination station for accommodating a subject to be examined;
   (b) source means for causing radiation to pass through and emerge from a portion of the subject;
   (c) imaging means responsive to a pattern of said emergent radiation to produce signals corresponding to an image of said pattern;
   (d) display means for producing a visual image corresponding to that represented by said signals;
   (e) control means comprising:
      (i) means for controlling source, imaging and display means to produce a study image in accordance with a protocol;

(ii) means for controlling said source, imaging and display means for producing a test image prior to the production of said study image, and (f) means for processing said signals exclusively in digital form for altering brightness information borne by members said signals not corresponding to the subject structure to a level defining a value within the dynamic range of said display means, said alternation being performed in response to the occurrence of brightness values among said members in excess of a predetermined range, while not alternation is performed on corresponding to the subject structure which signals have a brightness value less than said predetermined value.

12. The system of claim 11, wherein said alteration means comprises:
means for introducing into said image artifacts not corresponding to the actual structure of the subject.

13. A digital radiation imaging system comprising:
(a) a source for propagating penetrative radiation along a path;
(b) a penetrative radiation detector spaced from said source and positionable in said path;
(c) interpretive means associated with said detector for producing an image corresponding to radiation detected by said detector, said interpretive means having an inherent limitation defining a full scale saturation value for each of a plurality of pixels constituting said image;
(d) display means responsive to said interpretive means for producing a visual image corresponding to said detected radiation;
(e) means associated with said interpretive means for deliberately modifying said displayed image in accordance with the following criteria:
(i) where the brightness value for an image pixel is at least 100% of said full scale saturation value, said pixel is displayed as black, and
(ii) where the brightness value for a pixel is less than said full scale saturation value, said pixel is displayed in unmodified form.

14. A radiation object imaging system comprising:
(a) a source of penetrative radiation for imaging an object;
(b) a detector of penetrative radiation spaced from said source and defining a predetermined field of view;
(c) interpretative means coupled to said detector for producing digital signals defining an image comprising a plurality of image pixels, each pixel having associated therewith a brightness value as a function of an attribute of radiation incident on said detector at a location corresponding to said respective image pixel, said interpretative means defining a full scale saturation brightness value for each pixel, said interpretative means including means for processing in digital form image pixel brightness values for producing an image corresponding to radiation incident on said detector, and
(d) means for discarding, prior to processing by said interpretative means nd while still in digital form, data comprising brightness value image pixel representation equal to or in excess of said full scale brightness value, said discarding taking place in response to detection of said brightness values of signals not corresponding to the object structure being in excess of or equal to said saturation value, while not discarding signals corresponding to the object structure having brightness information less than said saturation value.

15. A radiation object imaging method utilizing a source or penetrative radiation for imaging an object, a detector of penetrative radiation spaced from said source and defining a predetermined field of view, said detector producing digital signals defining an image of viewed radiation, and interpretative means coupled to the detector for processing digital information from the detector to produce an image corresponding to radiation incident on the detector, said method comprising the steps of:
(a) actuating the source to propagate penetrative radiation incident on the detector;
(b) discarding detector information while still in digital form and prior to display representing a brightness value for signals not corresponding to the object structures in excess of a predetermined saturation value, said discarding step taking place in responses to detection of digital information defining a saturated value,
(c) retaining information having brightness value for signals corresponding to the object structure less than said predetermined value, and
(d) processing retained information to produce an image therefrom corresponding to radiation incident on the detector.

16. A method of conducting medical diagnostic imaging, said method comprising the steps of:
(a) propagating penetrative energy through a portion of the body of a patient to be examined;
(b) producing from a pattern of said radiation emergent from the patient's body a plurality of digital signals defining brightness values of respective pixels of an image represented by said digital signals;
(c) identifying those digital signals having brightness values in excess of a predetermined saturation value;
(d) transposing, while still in digital form, the brightness values of said identified signals by reducing said brightness values of said identified signals so that they fall within a predetermined first range of values;
(e) subsequently converting said digital signals to analog form; and
(f) applying said analog signals to a display means whose dynamic response range encompasses said first range of values into which the brightness values of said identified digital signals are transposed.

17. A method of conducting medical diagnostic imaging, said method comprising the steps of:
(a) propagating penetrative energy through a portion of the anatomy of a patient to be examined;
(b) producing from a pattern of said radiation emergent from the patient's anatomy a plurality of digital signals having respective brightness values representing an image of said pattern;
(c) modifying while in digital form, digital signals not corresponding to patient anatomical structure having a brightness value above a predetermined level to alter said represented image in accordance with predetermined criteria by introducing to said represented image visible aspects not related to the patients anatomy when imaged, in order to form a modified techniques image while not modifying corresponding to patient anatomical structure signals which have brightness less than said predetermined value;

(d) subsequently converting said digital signals to analog form and displaying said modified technique image;

(e) evaluating said modified technique image;

(f) again propagating penetrative energy through a portion of the patient's anatomy in accordance with a preselected actual imaging study protocol modified in accordance with said evaluation;

(g) producing from said energy emergent from the patient's anatomy another set of digital signals, representing an image of said pattern, in accordance with said actual study image protocol; and (h) displaying said actual study image represented by said another set of digital signals.

18. A radiation object imaging system comprising:
(a) a source for propagating penetrative radiation for imaging an object;
(b) a radiation detector spaced from the source to accommodate placement of a subject therebetween, said detector producing signals defining brightness values of an image corresponding to a pattern of said radiation emergent from said subject;
(c) interpretive means coupled to said detector for producing a display of an image represented by said signals, said interpretive means defining, because of an inherent limitation, a saturation value for image brightness, and
(d) processing means associated with said interpretive means for identifying those signals whose brightness values exceed said saturation value and for reducing, prior to display, the brightness values of said identified signals which do not correspond to the object structure to a predetermined lower level within the dynamic range of said interpretive means without affecting or changing the brightness values of signals, which correspond to the object wherein saturated regions structure said image are displayed at a level within the dynamic range of said interpretative means while leaving other regions of the image substantially unaffected.

19. The system of claim 18, wherein:
said system displays said saturated regions as substantially black.

20. A radiation object imaging method utilizing a source of penetrative radiation and a detector of penetrative radiation for detecting said radiation and producing signals representing brightness distribution of an image of said radiation incident upon the detector, said method comprising the steps of:
(a) propagating penetrative radiation through an object toward the detector;
(b) identifying those of said signals having brightness values greater than a predetermined saturation level and which do not correspond to the object structure;
(c) transposing the brightness value of said identified signals, in response to said identification, to a lower level below said saturation value without signals which corresponds to the object structure, and
(d) utilizing in combination said identified and brightness transposed signals and said other signals to produce an image corresponding visually to the detected pattern of radiation, but with saturated regions denoted by regions of relatively low brightness level within the image.

21. The method of claim 20, wherein:
the brightness levels of said identified signals are reduced to substantially zero, thus denoting saturated regions as substantially black.

22. A radiation object imaging system comprising:
(a) a source of penetrative radiation;
(b) a detector of penetration radiation for imaging an object spaced from said source and defining a predetermined field of view;
(c) interpretative means coupled to said detector for producing digital signals each bearing brightness information for representing an image comprising a plurality of respectively associated image pixels, each pixel having associated therewith a brightness value, as a function of an attribute of radiation incident on said detector at a location corresponding to said respective image pixel, said interpretative means defining a full scale saturation brightness value, said interpretative means including means for processing image pixel brightness values of said digital signals for producing an image corresponding to radiation incident on said detector, and
(d) means for processing, while in digital form, said digital signals to reduce the brightness values of digital signals having brightness values in excess of said saturation value to one or more levels less than said saturation value and which do not correspond to the object structure and for utilizing said reduced brightness value digital signals and other of said digital signals to produce a representation of said image wherein, in response to the detection of saturation, the regions of the image corresponding to said saturated regions of said radiation pattern incident on said detector are denoted as substantially black when the image is displayed, said signals correspond to the object structure not being affected.

23. A digital medical diagnostic imaging system comprising:
(a) structure defining a subject examination station for accommodating a patient to be examined;
(b) a source means for causing radiation to pass through and emerge from a portion of a patient's body when situated at said station;
(c) imaging means responsive to a pattern of said emergent radiation to produce digital signals corresponding to an image of said pattern, said imaging means comprising digital signal storage means having a limitation defining a full scale saturation value for brightness information borne by each said digital signal and means for comparing said brightness values of each said digital signal to said full scale saturation value;
(d) display means including digital to analog conversion means for producing a visual image corresponding to that represented by said digital signals;
(e) first control means for controlling said source, imaging and display means to produce a study, image in accordance with a predetermined protocol corresponding to a desired anatomical study;
(f) second control means for controlling said source, imaging and display means to produce a technique image prior to the production of said study image, said study and technique images each comprising a plurality of image pixels, and
(g) means for modifying said technique image prior to its display by deliberate introduction of a plurality of artifacts into said technique image as a function of respective image pixel brightness, as expressed by said digital signals, in response to a characteristic of said technique image, said artifact introduction means including means for operating in accordance with the following characteristic:
  (i) where the brightness value of a digital signal for a pixel corresponding to at least 100% of said full scale saturation value, the corresponding pixel is displayed at black, and
  (ii) where the brightness value corresponding to a digital signal for a pixel is less than a predetermined fraction of said full scale saturation value, the brightness of the corresponding pixel is displayed without modification.

24. A digital medical diagnostic imaging system comprising:
  (a) structure defining a subject examination station for accommodating a patient to be examined;
  (b) a source means for causing a radiation to pass through an emerge from a portion of a patient's body when situated at said stations;
  (c) imaging means responsive to a pattern of said emergent radiation to produce digital signals corresponding to an image of said pattern, said imaging means comprising digital signal storage means having a limitation defining a full scale saturation value for brightness information borne by each said digital signal and means for comparing said brightness values of each said digital signal to said full scale saturation value;
  (d) display means including digital to analog conversion means for producing a visual image corresponding to that represented by said digital signals;
  (e) first control means for controlling said source imaging and display means to produce a steady image in accordance with a predetermined protocol corresponding to a desired anatomical study;
  (f) second control means for controlling said source, imaging and display means to produce a technique image prior to the production of said study image, said study and technique images each comprising a plurality of image pixels, and
  (g) means for modifying said technique image prior to its display by deliberate introduction of a plurality of artifacts into said technique image as a function of respective image pixel brightness, as expressed by said digital signals, in response to a characteristic of said technique image, said artifact introduction means including means for operating in accordance with the following characteristics:
  (i) where the brightness value of a digital signal for a pixel corresponding to at least 100% of said full scale saturation value, the corresponding pixel is displayed at black;
  (ii) where a region includes pixels wherein the brightness signals corresponding to the digital signals for said pixels are greater than a predetermined fraction of said full scale saturation value, but less than said full scale saturation value, said region encompassing said pixels is displayed in accordance with an alternating dark and light gray scale mapping technique.

* * * * *